United States Patent [19]

Adachi

[11] Patent Number: 5,430,655

[45] Date of Patent: Jul. 4, 1995

[54] NAVIGATION SYSTEM FOR USE IN VEHICLE

[75] Inventor: Tsuneo Adachi, Saitama, Japan

[73] Assignee: Zexel Corporation, Tokyo, Japan

[21] Appl. No.: 91,688

[22] Filed: Jul. 15, 1993

[30] Foreign Application Priority Data

Jul. 16, 1992 [JP] Japan .................................. 4-210703

[51] Int. Cl.⁶ .............................................. G06F 15/50
[52] U.S. Cl. .................................. 364/449; 364/444; 340/990
[58] Field of Search ................. 364/444, 449, 447; 340/988, 990, 995, 994, 705, 729, 754

[56] References Cited

U.S. PATENT DOCUMENTS

| | | | |
|---|---|---|---|
| 4,646,089 | 2/1987 | Takanabe et al. | 340/995 |
| 4,926,336 | 5/1990 | Yamada | 364/444 |
| 4,937,570 | 6/1990 | Matsukawa et al. | 340/905 |
| 4,937,751 | 6/1990 | Nimura et al. | 364/449 |
| 5,031,104 | 7/1991 | Ikeda et al. | 364/449 |
| 5,115,398 | 5/1992 | De Jong | 364/443 |
| 5,168,452 | 12/1992 | Yamada et al. | 364/444 |
| 5,243,528 | 9/1993 | Lefebvre | 364/449 |
| 5,262,775 | 11/1993 | Tamai et al. | 340/995 |
| 5,272,638 | 12/1993 | Martin et al. | 364/444 |

FOREIGN PATENT DOCUMENTS 2-36038 12/1985 Japan.
3-150700 6/1991 Japan.

Primary Examiner—Kevin J. Teska
Assistant Examiner—Tan Q. Nguyen

[57] ABSTRACT

A vehicle navigation system in which an optimum route from a starting point to a destination is computed in accordance with map information. A route guide is displayed in accordance with the current position of the vehicle and the optimum route. The route guiding information includes an image indicating the direction of vehicle progress from an intersection where the vehicle should turn, the name of the road the vehicle is to enter, and the name of a road intersecting the road on which the vehicle is currently running between the current position of the vehicle and the intersection where the vehicle should turn.

8 Claims, 4 Drawing Sheets

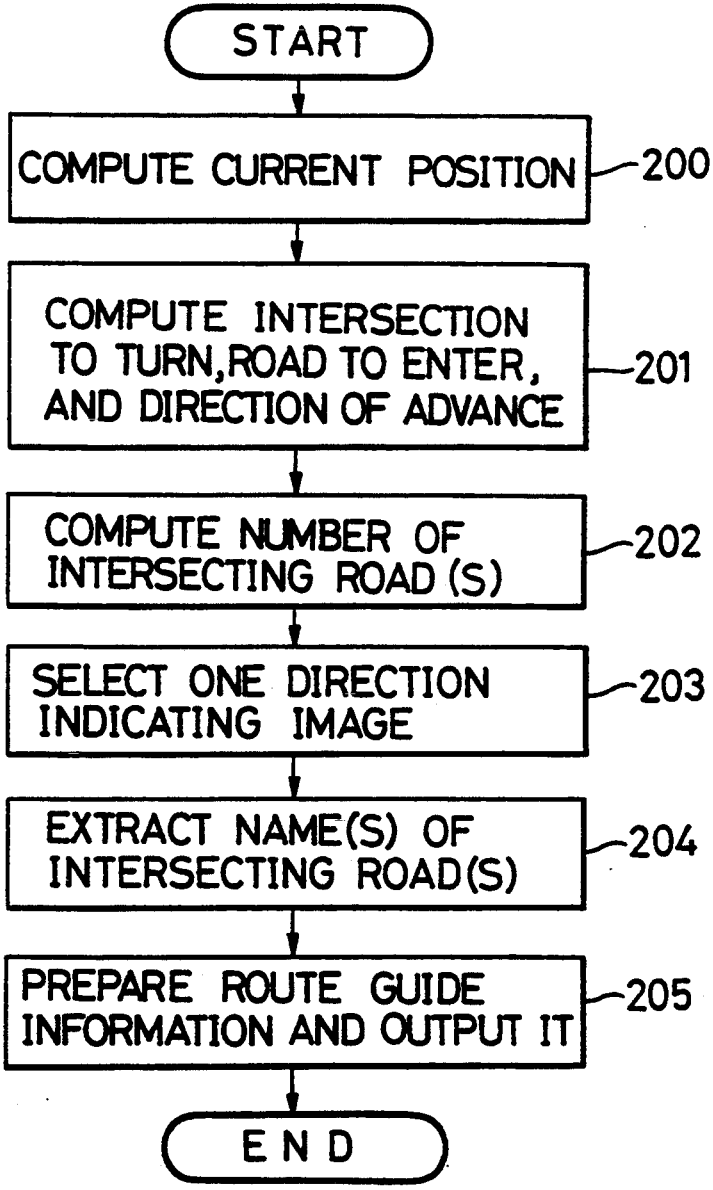

NAVIGATION SYSTEM FOR USE IN VEHICLE

BACKGROUND OF THE INVENTION

This invention relates to a navigation system for use in a vehicle which displays a route guide for guiding the vehicle along an optimum route.

A general navigation system for use in a vehicle beforehand computes an optimum route from a starting point to a destination prior to the start of the vehicle, and a route guide corresponding to the current position of the vehicle is displayed in its display unit after the start of the vehicle, so that the vehicle may be guided to the destination along the optimum route.

In the navigation systems disclosed in Japanese Laid-Open Patent Application No. 150700/91 and Japanese Patent Publication No. 36038/90, respectively, a direction indicating image indicating the direction of vehicle travel at the intersection, where the vehicle should turn, and the name of the road the vehicle is to enter at that intersection are displayed on the display unit. In the above-mentioned systems, in order to enable the driver to correctly recognize the intersection where the vehicle should turn, a bar graph representing the distance from the current position of the vehicle to the intersection where the vehicle should turn next is displayed on the display unit. Seeing this bar graph, the driver may recognize the distance to the intersection where the vehicle should turn next. This makes it possible for the driver to prepare for the next turn. However, there are instances where the above distance information is not enough for the driver to make a correct decision as to when the vehicle should change its lane in order to make the next turn. After the vehicle changes lanes in accordance with the distance information, it is possible that there are other roads which intersect the road on which the vehicle is currently travelling between the point where the vehicle changes lanes and the intersection where the vehicle is to turn. In that event, the driver has no choice but to turn onto the intersection road. As a result, the driver has strayed from the optimum route. If the driver does not change lanes until he is very near the intersection where the vehicle is to turn to avoid the possibility of other roads intersecting the road on which his vehicle is currently travelling, the driver may not be able to change lanes with the result that he vehicle cannot turn at the intersection where the vehicle should turn, particularly when there is heavy traffic. As a result, the driver has strayed from the optimum route. As described above, the above-mentioned distance display means is unable to fully exhibit its function.

In Japanese Laid-Open Patent Application No. 150700/91, marks representing buildings, and other structures located in the vicinity of the intersection where the vehicle is to turn are displayed on the display unit in order to facilitate the driver's easy recognition of the aforesaid intersection. However, since the driver cannot recognize the buildings until the vehicle is very near the intersection where the vehicle is to turn, the above-mentioned disadvantages cannot be eliminated.

SUMMARY OF THE INVENTION

The present invention provides a navigation system which enables the driver to correctly recognize the time to change lanes before the vehicle reaches the intersection where the vehicle is to turn, According to the present invention, a navigation system for use in a vehicle comprises map information storage means for storing a map information including at least a road network;

optimum route computation means for computing an optimum route from a starting point to a destination in accordance with the map information;

current position detection means for detecting a current position of the vehicle;

computation means for computing an intersection where the vehicle should turn and a direction of travel of the vehicle from the intersection, and the name of the road for the vehicle to enter in accordance with the current position of the vehicle and the optimum route;

intersecting road extraction means for extracting, from the map information, at least one road which intersects a road on which the vehicle is currently travelling along the optimum route between the current position of the vehicle and the intersection at which the vehicle is to turn; and route guiding information output means for outputting a route guiding information including a direction indicating image indicating the direction of advance from the intersection, the name of the road for the vehicle to enter, and the name of the intersecting road; and display means comprising a monitor, said display means displaying first or second direction indicating images on the monitor when the vehicle travels along the optimum route.

BRIEF DESCRIPTION OF THE DRAWINGS

FIG. 5 is a flow chart showing a routine of an optimum route computation executed by the microcomputer;

FIG. 6 is a flow chart showing a routine of the route guide executed by the microcomputer;

DETAILED DESCRIPTION OF THE EMBODIMENT

Figure 1:
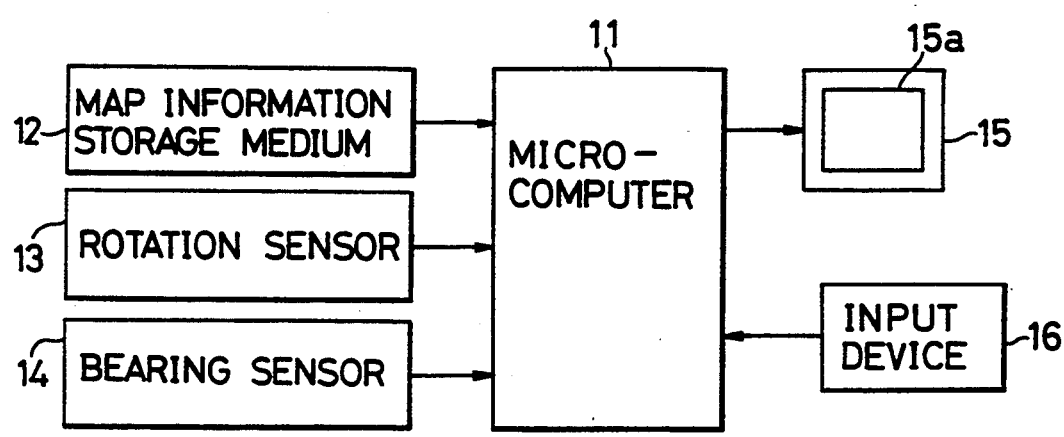
FIG. 1 is a block diagram of a navigation system for use in a vehicle.

The present invention will be described hereinafter in detail with reference to the accompanying drawings. As shown in FIG. 1, the navigation system comprises a microcomputer 11, a map information storage medium (map information means) 12 comprising a ROM in which map information including at least a road network and names of roads are stored, a rotation sensor 13 for outputting pulses in accordance with the rotation of an axle, a bearing (azimuth) sensor 14 for detecting the direction of travel of the vehicle, which are frequently changed with the progress of time, a CRT display unit 15 (display means) for displaying route guiding information, and an input device 16. The input device 16 comprises a keyboard, or it may comprise a touch key provided to a monitor 15a of the display unit 15, or the like.

Operation of the microcomputer 11 will be generally described. The information about a starting point and a destination inputted are input into microcomputer 11 from input device 16. The microcomputer 11 determines the current position of the vehicle prior to its start as the starting point without relying upon the information from input device 16. As shown in FIG. 5, prior to the start of the vehicle, microcomputer 11 computes an optimum route from starting point to destination in accordance with the map information stored in the map information storage medium 12. The optimum route calculates the shortest distance or the shortest time from starting point to destination.

After starting, microcomputer 11 computes the travel distance in accordance with a pulse from rotation sensor 13, and the direction of travel of the vehicle and its changes in accordance with a signal from bearing sensor 14. Then, microcomputer 11 computes the current position of the vehicle in accordance with the starting point, the travel distance, the record of the change in direction., and the current direction of travel of the vehicle. The current position may be computed in accordance with signals from at least three artificial satellites.

In order to guide the vehicle from starting point to destination along the optimum route, microcomputer 11 displays the route guide on a display unit 15. To display this route guide, microcomputer 11 stores three groups of direction indicating images in its memory.

Figure 2A:
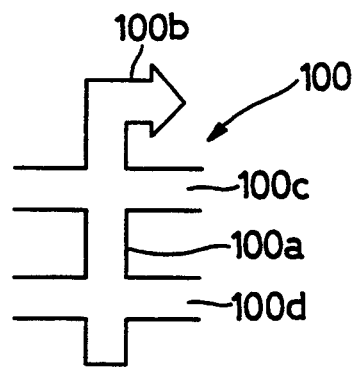
FIGS. 2A, 2B, and 2C show direction indicating images which are stored in a microcomputer of the system of FIG. 1.

FIG. 2A shows a direction indicating image 100. This direction indicating image 100 includes a straight vertical portion 100a extending vertically and representing the road on which the vehicle is currently travelling, an arrow portion 100b extending from an upper end of straight vertical portion 100a and representing the direction of travel of the vehicle at the intersection where the vehicle is to turn, and two horizontal portions 100c, 100d representing two intersecting roads (each intersecting road intersects the road on which the vehicle is currently travelling between the current position of the vehicle and the intersection where the vehicle is to turn) and intersecting the straight vertical portion 100a. There are six variations of direction indicating image 100 which form the first group of direction indicating images:

(1) arrow portion 100b represents a 90 degree right turn, as shown in FIG. 2A,
(2) arrow portion 100b represents a 90 degree left turn,
(3) arrow portion 100b represents a 45 degree right turn,
(4) arrow portion 100b represents a 45 degree left turn,
(5) arrow portion 100b represents a 135 degree right turn, and
(6) arrow portion 100b represents a 135 degree left turn.

Figure 2B:
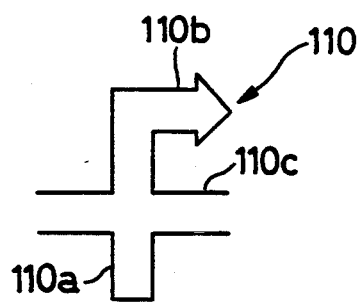

FIG. 2B shows a direction indicating image 110. This direction indicating image 110 includes a straight vertical portion 110a extending vertically and representing the road on which the vehicle is currently travelling, an arrow portion 110b extending from an upper portion of straight vertical portion 110a and representing the direction of travel at the intersection where the vehicle is to turn, and a horizontal portion 110c intersecting straight vertical portion 110a and representing an intersecting road. There are six variations of direction indicating image 110 which form the second group of direction indicating images in each variation, arrow portion 110b indicates a different direction.

Figure 2C:
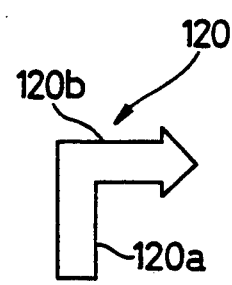

FIG. 2C shows a direction indicating image 120. This direction indicating image 120 includes a straight vertical portion 120a extending vertically and representing the road on which the vehicle is currently travelling, and an arrow portion 120b extending from an upper end of straight vertical portion 120a and representing the direction of travel of the vehicle at the intersection where the vehicle is to turn. However, direction indicating image 120 does not include horizontal portions representing intersecting roads. There are six variations of direction indicating image 120 which form the third group of direction indicating images. In each variation, arrow portion 120b indicates a different direction.

Figure 3:
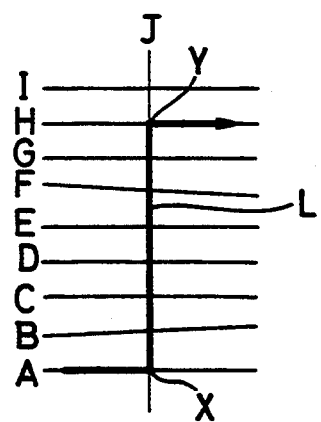
FIG. 3 is an example of a road network and an optimum route.

The route guide determined by the microcomputer 11 will be described by way of an example in which the vehicle is travelling along an optimum route L, as shown in FIG. 3. The vehicle makes a 90 degree left turn at intersection X to enter road J from road A and then makes a 90 degree right turn at intersection Y to enter road H from road J.

Figure 4A:
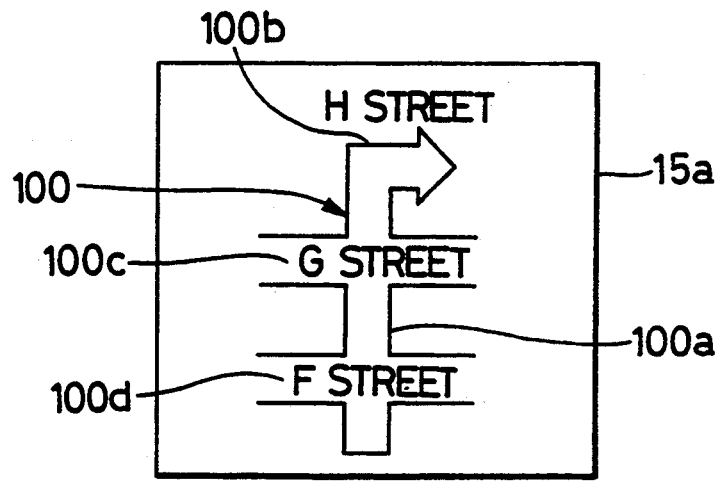
FIGS. 4A, 4B, and 4C show route guides displayed on the display unit as the vehicle travels along the optimum route of FIG. 3.

A route guide available after the vehicle made a left turn at the intersection X and entered the road J will be described with reference to FIGS. 4A-4C. Immediately after the vehicle enters road J, six roads B to G intersect road J between the current position of the vehicle and intersection Y where the vehicle is to turn. At this time, as shown in FIG. 4A, direction indicating image 100, which includes two horizontal portions 100c, 100d and arrow portion 100b bent 90 degrees to the right, is selected and displayed on monitor 15a of display unit 15. At the same time, the name of road H onto which the vehicle enters after making a right turn at intersection Y is displayed on an upper portion (in the vicinity of arrow portion. 100b) of monitor 15a, the name of road G nearest to intersection Y is displayed at upper horizontal portion 100c near the arrow portion 100b, and the name of the intersecting road F second nearest to intersection Y is displayed at the lower horizontal portion 100d. Until the vehicle passes road F, the route guide display of FIG. 4A is maintained.

Figure 4B:
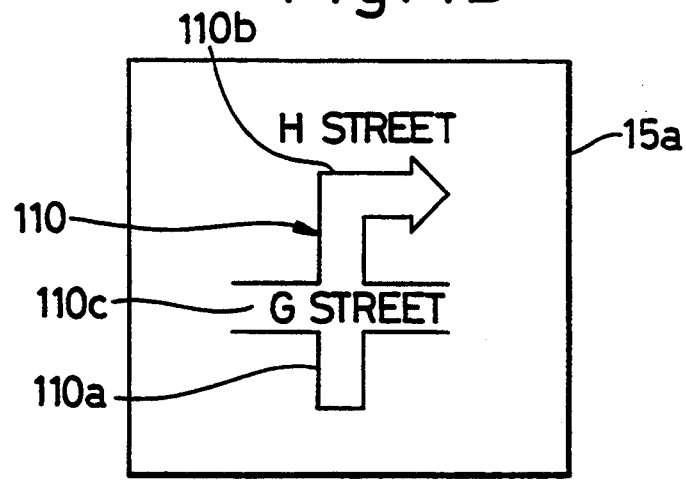

As shown in FIG. 4B, after the vehicle passes road F, direction indicating image 110, which includes a single horizontal portion 110c and arrow portion 110b is bent 90 degrees to the right, is selected and displayed on monitor 15a of display unit 15. At the same time, the name of road H which the vehicle should enter after making a right turn at intersection Y is displayed at an upper portion of monitor 15a, and the name of the sole intersecting road G located between the current position of the vehicle and intersection Y is displayed at horizontal portion 110c. Until the vehicle passes road G, the route guide display of FIG. 4B is maintained.

Figure 4C:
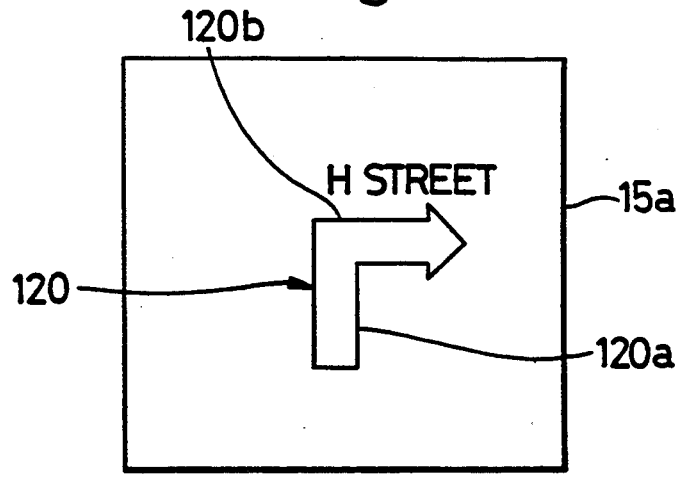

As shown in FIG. 4C, after the vehicle passes road G, direction indicating image 120 in which arrow portion 120b is bent 90 degrees to the right is selected and displayed on monitor 15a of display unit 15. At the same time, the name of road H onto which the vehicle enters after making a right turn at intersection Y is displayed at an upper portion of monitor 15a.

From the route guide display of FIG. 4A,, the driver knows that it is not the right time to change lanes. Also, the driver recognizes, from the route guide display of FIG. 4B, that it is approaching the time to change lanes. Further, by confirming that the name of the intersecting road displayed at horizontal portion 110c of direction indicating image 110 is identical with the name of the road shown on a mark at the actual intersection, the driver confirms that the vehicle has passed this intersecting road. When the route guide display of monitor 15a is switched from FIG. 4B and FIG. 4C, the driver recognizes that the time to change lanes has arrived. As a result, the driver can change the lane at the best timing, and the vehicle can positively enter road H at intersection Y, and the vehicle can keep running along optimum route L.

The routine for the route guide executed by microcomputer 11 will be described with reference to FIG. 6. This routine is executed at predetermined intervals of time. First, the current position of the vehicle is computed in the manner as described above (Step 200).

The intersection where the vehicle should turn next, the direction of travel of the vehicle from this intersection, and the name of the road onto which the vehicle is to enter are computed in accordance with the current position, the optimum route, and the map information (Step 201).

For example, when the vehicle is running on road J as in FIG. 3, intersection Y, the direction of travel (90 degrees rightwardly), and the name of the road (H street) for the vehicle to enter are computed.

Then, the number of road or roads (hereinafter referred to as "intersecting road or roads") intersecting the road on which the vehicle is currently travelling between the current position of the vehicle and the intersection where the vehicle is to turn is computed (Step 202).

Thereafter, in accordance with the number of the intersecting roads computed in Step 202 and the direction of travel computed in Step 201, one of the predetermined direction indicating images is selected (Step 203). In the case where the number of intersecting roads is two or more, direction indicating image 100 of the first group as in FIG. 2A is selected. In the case where there is only one intersecting road, direction indicating image 110 of the second group as in FIG. 2B is selected. In the case where there are no intersecting roads, direction indicating image 120 of the third group as in FIG. 2C is selected[. For example, when the current position of the vehicle is between road A and road F as in FIG. 3, the number of intersecting roads ranges from 2 to 6, direction indicating image 100 is selected. When the current position of the vehicle is between road F and road G, the number of intersecting roads equals 1, direction indicating image 110 is selected. When the current position of the vehicle is between road G and road H, there are no intersecting roads, direction indicating image 120 is selected.

Then, the name of the above intersecting road is extracted from the names stored in map information storage medium 12 (Step 204). In the case where there are two or more intersecting roads, the first and second intersecting roads, counting from the intersection where the vehicle should turn toward the current position of the vehicle, are extracted. For example, when the current position of the vehicle is between road A and road F in FIG. 3, the names of roads G and F are extracted as the names of the first and second intersecting roads, respectively. In the case where there is only one intersecting road, only the name of this intersecting road is extracted. For example, when the current position of the vehicle is between roads F and G in FIG. 3, only the name of road G is extracted. When there are no intersecting roads, for example, when the current position of the vehicle is between roads G and H in FIG. 3, no names of intersecting roads are extracted.

Then, the route guide information is prepared and output to display unit 15 (Step 205). The route guide information is a combination of one of the direction indicating images, the name of the intersecting road or roads, and the name of the road onto which the vehicle should enter. The route guide is displayed as in FIGS. 4A, 4B, and 4C.

Figure 7:
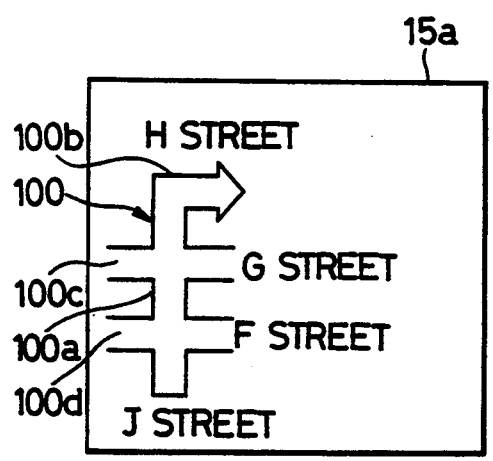
FIG. 7 shows another example of the route guide displayed on the display unit.

As shown in FIG. 7, the names of intersecting roads may be indicated to either side (right-hand side in the illustrated example) of horizontal portions 100c, 100d of direction indicating image 100 and the road on which the vehicle is currently travelling may be indicated at a lower side of straight vertical portion 100a. In that case, direction indicating images 110, 120 are displayed in a manner similar to FIG. 7.

In the above embodiment, although a direction indicating image including two horizontal portions is used in the case where there are at least two intersecting roads, a direction indicating image having one horizontal portion may be used. In that case, the name of the intersecting road nearest to the intersection where the vehicle is to turn is indicated in the horizontal portion. A direction indicating image including at least three horizontal portions may be used in the case where there are at least three intersecting roads.

Figure 8:
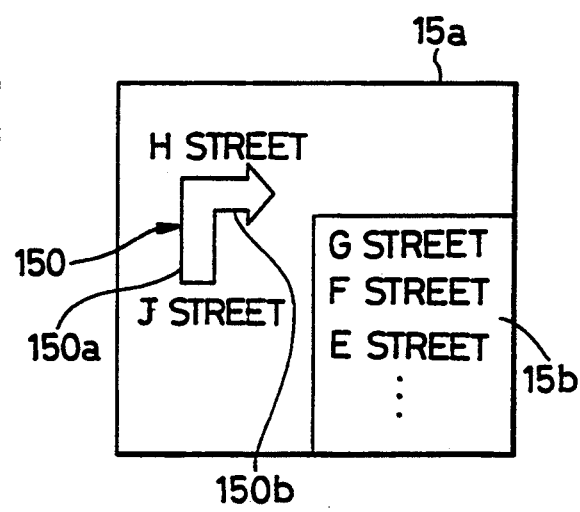
FIGS. 8 to 10 show further examples of route guides displayed on the display unit.

In the variation of the route guide display shown in FIG. 8, direction indicating image 150 includes only a straight vertical portion 150a representing the road on which the vehicle is currently travelling and an arrow portion 150b representing the direction of travel of the vehicle at the intersection where the vehicle is to turn. The direction indicating image 150 does not include the horizontal portion or portions representing the intersecting road or roads. The name of the road on which the vehicle is currently travelling is indicated in the vicinity of a lower end of straight vertical portion 150a and the name of the road onto which the vehicle is to enter at the intersection is indicated near arrow portion 150b. The monitor 15a has an area 15b away from direction indicating image 150, and the names of the intersecting roads are indicated in this area 15b. In other words, the names of the intersecting roads located in order from the intersection where the vehicle is to turn toward the current position of the vehicle are displayed. When the vehicle passes one of the intersecting roads, the name of the passed intersecting road (indicated in the lowest position) is deleted. When the name of the last intersecting road displayed in area 15b is deleted, the driver recognizes that it is time to change lanes. The number of names of intersecting roads displayed in area 15b is limited to a predetermined number. In the case where the number of intersecting roads exceeds the predetermined number, it is preferable that the names of the intersecting roads nearer the intersection where the vehicle is to turn are displayed.

Figure 9:
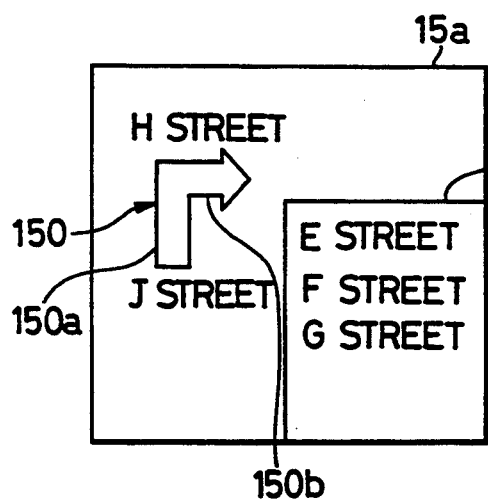

The route guide display shown in FIG. 9 resembles that of FIG. 8. In contrast with FIG. 8, however, FIG. 9 displays the names of the roads in order from the current position of the vehicle towards the intersection where the vehicle is to turn in area 15b. In that case, :since the name of the intersecting road which the vehicle will pass next is indicated in the uppermost position of area 15b, the driver can easily recognize the current position of the vehicle. The number of names of intersecting roads displayed in area 15b are limited to a predetermined number. In the case where the number of intersecting roads exceeds the predetermined number, it is preferable that the names of the intersecting roads nearer the current position of the vehicle are displayed so that the driver can easily recognize the current position of the vehicle. However, in order for the driver to remember the names of the intersecting roads closer to the intersection, the names of the intersecting roads closer to the intersection where the vehicle is to turn are displayed in order.

Figure 10:
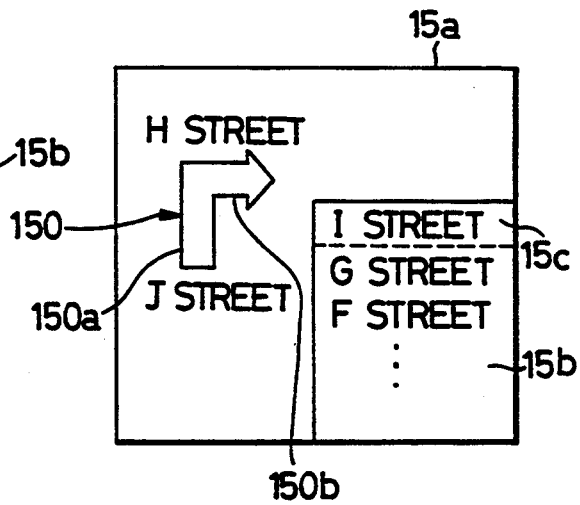

As shown in FIG. 10, it may be arranged so that an upper portion of area 15b is divided from the remaining area to serve as a special area 15c. In special area 15c, the name of the first road (I street in the example of FIG. 3) intersecting the road on which the vehicle is currently travelling after the vehicle has passed in the intersection where the vehicle was to have turned is displayed. With this arrangement, when the vehicle has passed intersection Y where the vehicle should have turned, the driver easily recognizes that the vehicle has passed the aforesaid intersection.

The present invention is not limited to the above embodiment, but various modifications can be made without departing from the scope of the appended claims. For example, it may be arranged such that the current position of the vehicle and the passage of intersections on the optimum route are detected at predetermined intervals of time, and the routine for the route guide is executed every time the vehicle passes the intersections.

What is claimed is:

1. A navigation system for use in a vehicle, comprising:
    map information storage means for storing a map information, said map information including at least a road network;
    optimum route computation means for computing an optimum route from a starting point to a destination in accordance with said map information;
    current position detection means for detecting a current position of the vehicle;
    computation means for computing an intersection where the vehicle should turn and a direction of travel of the vehicle from said intersection in accordance with said current position of the vehicle and said optimum route;
    intersecting road detection means for detecting, from said map information, at least one nearest intersecting road which intersects a road on which the vehicle is currently travelling along said optimum route between said current position of the vehicle and said intersection at which the vehicle is to turn; and
    display means comprising a monitor said display means displaying first or second direction indicating images on said monitor while the vehicle is travelling along said optimum route, said first direction indicating image including a straight vertical portion representing the road on which the vehicle is currently travelling and an arrow portion extending from an upper end of said straight vertical portion indicating said direction of travel of the vehicle at the intersection at which the vehicle is to turn, said second direction indicating image including said straight vertical portion, said arrow portion, and a first horizontal portion which intersects said straight vertical portion indicating a nearest intersecting road, which is closest to said intersection at which the vehicle is to turn; and
    said display means displaying said second direction indicating image before the vehicle passes said nearest intersecting road and displaying said first direction indicating image after the vehicle passes said nearest intersecting road.

2. A navigation system according to claim 1, wherein said display means displays a third direction indicating image when there is a plurality of said nearest intersecting roads, said third direction indicating image including a second horizontal portion, said straight vertical portion, said arrow portion, and said first horizontal portion, said second horizontal portion representing a second intersecting road counted from the intersection where the vehicle is to turn toward said current position of the vehicle, said second horizontal portion intersecting said straight vertical portion and located on a lower side of the said first horizontal portion.

3. A navigation system as claimed in claim 2, wherein said map information storage means also stores names of roads, and said navigation system further comprising:
    means for determining a name of a road for the vehicle to enter from said intersection, a name of the nearest intersecting road, and a name of a second intersecting road,
    wherein said display means displays said name of the road for the vehicle to enter in the proximity of said arrow portion, said name of the nearest intersecting road in the proximity of said first horizontal portion, and said name of the second intersecting road in the proximity of said second horizontal portion.

4. A navigation system as claimed in claim 1, wherein said map information storage means also stores names of roads, and said navigation system further comprising:
    means for determining a name of a road for the vehicle to enter from said intersection and a name of the nearest intersecting road,
    wherein said display means displays a name of the road for the vehicle to enter in the proximity of said arrow portion and said name of the nearest intersecting road in the proximity of said first horizontal portion.

5. A navigation system for use in a vehicle, comprising:
    map information storage means for storing a map information, said map information including at least a road network and names of roads;
    optimum route computation means for computing an optimum route from a starting point to a destination in accordance with said map information;
    current position detection means for detecting a current position of the vehicle;
    computation means for computing an intersection where the vehicle should turn, a direction of travel of the vehicle from said intersection, and a name of a road that the vehicle will enter when it turns, in accordance with said current position of the vehicle and said optimum route;
    intersecting road detection means for detecting, from said map information, names of roads intersecting a road on which the vehicle is currently travelling between said current position of the vehicle and said intersection at which the vehicle is to turn; and
    display means comprising a monitor, said display means displaying a direction indicating image on a first area of said monitor when the vehicle travels along said optimum route, said direction indicating image including a straight vertical portion representing the road on which the vehicle is currently travelling and an arrow portion extending from an upper end of said straight vertical portion indicating said direction of travel of the vehicle at the intersection at which the vehicle is to turn, said display means displaying said name of the road for the vehicle to enter in the proximity of said arrow portion, said display means displaying said names of intersecting roads in a second area of said monitor when the vehicle travels along said optimum route.

6. A navigation system according to claim 5, wherein said display means displays said intersecting roads in said area in order beginning at said intersection for the vehicle to turn toward said current position of the vehicle.

7. A navigation system according to claim 5, wherein said display means displays said intersecting roads in said area in order beginning at said current position of the vehicle toward said intersection for the vehicle to turn.

8. A navigation system according to claim 5, wherein said display means displays, in a special area of said monitor, the name of the first road intersecting the road on which the vehicle is currently running when the vehicle has passed the intersection where the vehicle should turn and has not turned.

* * * * *